(12) United States Patent
Hasegawa

(10) Patent No.: US 8,521,179 B2
(45) Date of Patent: Aug. 27, 2013

(54) MOBILE UNIT'S POSITION MEASUREMENT APPARATUS AND MOBILE UNIT'S POSITION MEASUREMENT METHOD

(75) Inventor: Naoto Hasegawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 168 days.

(21) Appl. No.: 13/130,163

(22) PCT Filed: Nov. 19, 2009

(86) PCT No.: PCT/IB2009/007500
§ 371 (c)(1),
(2), (4) Date: May 19, 2011

(87) PCT Pub. No.: WO2010/058266
PCT Pub. Date: May 27, 2010

(65) Prior Publication Data
US 2011/0230207 A1    Sep. 22, 2011

(30) Foreign Application Priority Data

Nov. 19, 2008   (JP) ................................ 2008-296029

(51) Int. Cl.
| | |
|---|---|
| H04W 24/00 | (2009.01) |
| H04B 17/00 | (2006.01) |
| G01S 19/39 | (2010.01) |
| G01S 19/40 | (2010.01) |
| G01S 19/45 | (2010.01) |
| G01S 19/07 | (2010.01) |
| G01S 19/23 | (2010.01) |
| G01S 19/25 | (2010.01) |
| G01S 5/10 | (2006.01) |
| H04B 7/216 | (2006.01) |

(52) U.S. Cl.
USPC .................. 455/456.1; 455/67.11; 455/456.3; 342/357.22; 342/357.23; 342/357.28; 342/357.31; 342/357.44; 342/357.62; 342/357.78; 370/335; 370/342

(58) Field of Classification Search
USPC ... 455/456.1, 456.3, 257, 67.11; 342/357.44, 342/357.36, 357.31, 357.23, 357.14, 357.3, 342/357.27, 357.62, 357.59, 357.28, 357.68, 342/357.78, 357.64, 389.1; 701/217, 220
See application file for complete search history.

(56) References Cited

U.S. PATENT DOCUMENTS

| 5,428,647 A * | 6/1995 | Rasky et al. ................. 375/366 |
| 6,091,359 A * | 7/2000 | Geier ....................... 342/357.31 |
| 2010/0026566 A1 | 2/2010 | Ueda et al. |
| 2010/0302030 A1* | 12/2010 | Yamada .................... 340/539.13 |

FOREIGN PATENT DOCUMENTS

| JP | 7 43446 | 2/1995 |
| JP | 2001 264409 | 9/2001 |
| WO | 2008 108194 | 9/2008 |

OTHER PUBLICATIONS

International Search Report Issued May 7, 2010 in PCT/IB09/007500 filed Nov. 19, 2009.

* cited by examiner

Primary Examiner — Inder Mehra
(74) Attorney, Agent, or Firm — Oblon, Spivak, McClelland, Maier & Neustadt, L.L.P.

(57) ABSTRACT

A mobile unit's position measurement apparatus is provided. The apparatus includes an observation data selection portion that calculates a plurality of estimated error values that correspond respectively to the plurality of pieces of observation data obtained by observing the signals received by the reception portion, that generates groups each of which includes estimated error values corresponding to at least a predetermined number of satellites, and then extracts, from the estimated error value groups generated, in which a difference between a maximum value and a minimum value of the estimated error values included is less than a predetermined value, and that consequently selects pieces of observation data provided by the signals from the satellites that correspond to the estimated error values that are included in an estimated error value group whose standard deviation of the estimated error values is smallest among the estimated error value groups extracted.

13 Claims, 4 Drawing Sheets

MOBILE UNIT'S POSITION MEASUREMENT APPARATUS AND MOBILE UNIT'S POSITION MEASUREMENT METHOD

BACKGROUND OF THE INVENTION

1. Field of the Invention

The invention relates to a mobile unit's position measurement apparatus and a mobile unit's position measurement method for measuring the position of a mobile unit on the basis of signals from satellites.

2. Description of the Related Art

Apparatuses that measure the position of a mobile unit on the basis of signals from satellites have been widely used. A problem of these apparatuses is the so-called multipath phenomenon. This is a phenomenon in which when a receiver receives a signal from a satellite that is reflected from a building or the like, the acquired distance (pseudo-distance) between the receiver and the satellite deviates from the actual distance therebetween, so that the present position of the apparatus is falsely recognized.

In conjunction with this problem, an invention has been disclosed which relates to a method in which the positioning computation is performed through the use of only signals from satellites with respect to which a difference between an observed amount of Doppler shift and an estimated amount of Doppler shift that is calculated by the so-called Inertial Navigation System (INS) on the basis of an output of a gyro-sensor or a vehicle speed sensor is smaller than a threshold value (see, for example, Japanese Patent Application Publication No. 2001.264409 (JP-A-2001-264409)).

However, in this related-art method, it may happen that no satellite is selected if a relatively large error occurs in the position or velocity of a mobile unit which is calculated on the basis of an output of a gyro-sensor or a vehicle speed sensor. Therefore, in some cases, the position of a mobile unit cannot be continuously and accurately measured.

SUMMARY OF THE INVENTION

The invention provides a mobile unit's position measurement apparatus that performs the position measurement (positioning) of a mobile unit with increased continuity and precision.

A mobile unit's position measurement apparatus according to a first aspect of the invention includes: reception means for receiving signals from a plurality of satellites; observation data selection means for selecting some or all of a plurality of pieces of observation data that are obtained by observing the signals received by the reception means; and positioning computation means for performing a positioning computation based on the pieces of observation data selected by the observation data selection means, wherein the observation data selection means calculates a plurality of estimated error values that correspond respectively to the plurality of pieces of observation data obtained by observing the signals received by the reception means, and extracts, from the plurality of estimated error values calculated, estimated error value groups which respectively include at least a predetermined number of estimated error values and in which a difference between a maximum value and a minimum value of the predetermined number of estimated error values included is less than a predetermined value, and selects pieces of observation data provided by the signals from the satellites that correspond to the estimated error values that are included in an estimated error value group whose standard deviation of the estimated error values is smallest among the estimated error value groups extracted.

According to the first aspect of the invention, it is possible to perform the positioning or position measurement of a mobile unit with increased continuity and precision.

Incidentally, to calculate estimated error values, for example, comparison of observation data regarding the position or velocity of a mobile unit with the position or velocity thereof which is calculated by the inertial navigation system (INS) or the like is performed.

A mobile unit's position measurement method according to a second aspect of the invention includes: calculating a plurality of estimated error values that correspond respectively to a plurality of pieces of observation data that are obtained by observing signals transmitted from a plurality of satellites; extracting, from the plurality of estimated error values calculated, estimated error value groups which respectively include at least a predetermined number of estimated error values and in which a difference between a maximum value and a minimum value of the predetermined number of estimated error values included is less than a predetermined value; selecting pieces of observation data provided by the signals from the satellites that correspond to the estimated error values that are included in an estimated error value group whose standard deviation of the estimated error values is smallest among the estimated error value groups extracted; and performing a positioning computation based on at least one or all of the pieces of observation data selected.

According to the second aspect of the invention, it is possible to perform the positioning or position measurement of a mobile unit with increased continuity and precision.

A mobile unit's position measurement apparatus according to a third aspect of the invention includes: a reception portion that receives signals from a plurality of satellites; an observation data selection portion that calculates a plurality of estimated error values that correspond respectively to the plurality of pieces of observation data obtained by observing the signals received by the reception means, and that extracts, from the plurality of estimated error values calculated, estimated error value groups which respectively include at least a predetermined number, of estimated error values and in which a difference between a maximum value and a minimum value of the predetermined number of estimated error values included is less than a predetermined value, and that selects pieces of observation data provided by the signals from the satellites that correspond to the estimated error values that are included in an estimated error value group whose standard deviation of the estimated error values is smallest among the estimated error value groups extracted; and a positioning computation portion that performs a positioning computation based on the pieces of observation data selected by the observation data selection portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

First Embodiment

A mobile unit's position measurement apparatus 1 in accordance with a first embodiment of the invention will be described below. The mobile unit's position measurement apparatus 1 is applied to the so-called Global Navigation Satellite System (GNSS). The GNSS is a positioning system in which, using signals from satellites, a positioning apparatus measures the position of a mobile unit, and the GNSS includes positioning systems that use satellites, such as the Global Positioning System (GPS), the Galileo, the Glonass, etc. Although the following description will be made with the GPS adopted as a basic construction of the first embodiment of the invention, the invention is applicable not only to the GPS, but widely to all the GNSSs.

The GPS is composed of GPS satellites that orbit the earth, and positioning apparatuses such as a mobile unit's position measurement apparatus 1 of this embodiment. The mobile unit's position measurement apparatus 1 can be mounted in, for example, a motor vehicle, a motor cycle, a railroad train, a ship, an aircraft, a forklift, a robot, a cellular phone that is mobile carried by a human, etc. The following description will be made on the assumption that the mobile unit's position measurement apparatus 1 is mounted in a motor vehicle.

The GPS satellites continuously transmit navigation messages (satellite signals) toward the earth. A navigation message includes satellite orbit information regarding a corresponding GPS satellite (ephemeris and almanac), a clock correction value, and an ionosphere correction value. Navigation messages are continuously transmitted toward the earth, diffused by a coarse acquisition code (C/A code) and superimposed on an L1 wave (whose frequency is 1575.42 MHz). Incidentally, the L1 wave is a composite wave that is made up of a C/A code-modulated sine wave and a precision code (P code)-modulated cosine wave, and that is orthogonally modulated. The C/A code and the P code are pseudo noise codes each made up of a code string in which −1 and 1 are arranged in irregular cycles.

Today, there are 24 GPS satellites circling the earth at an altitude of about 20,000 kin, and four GPS satellites are equidistantly disposed in each of six orbital planes of the earth that are tilted from each other by an angle of 55 degrees. Therefore, at any location on the earth that has an open sky, at least five GPS satellites can always be observed.

Figure 1:
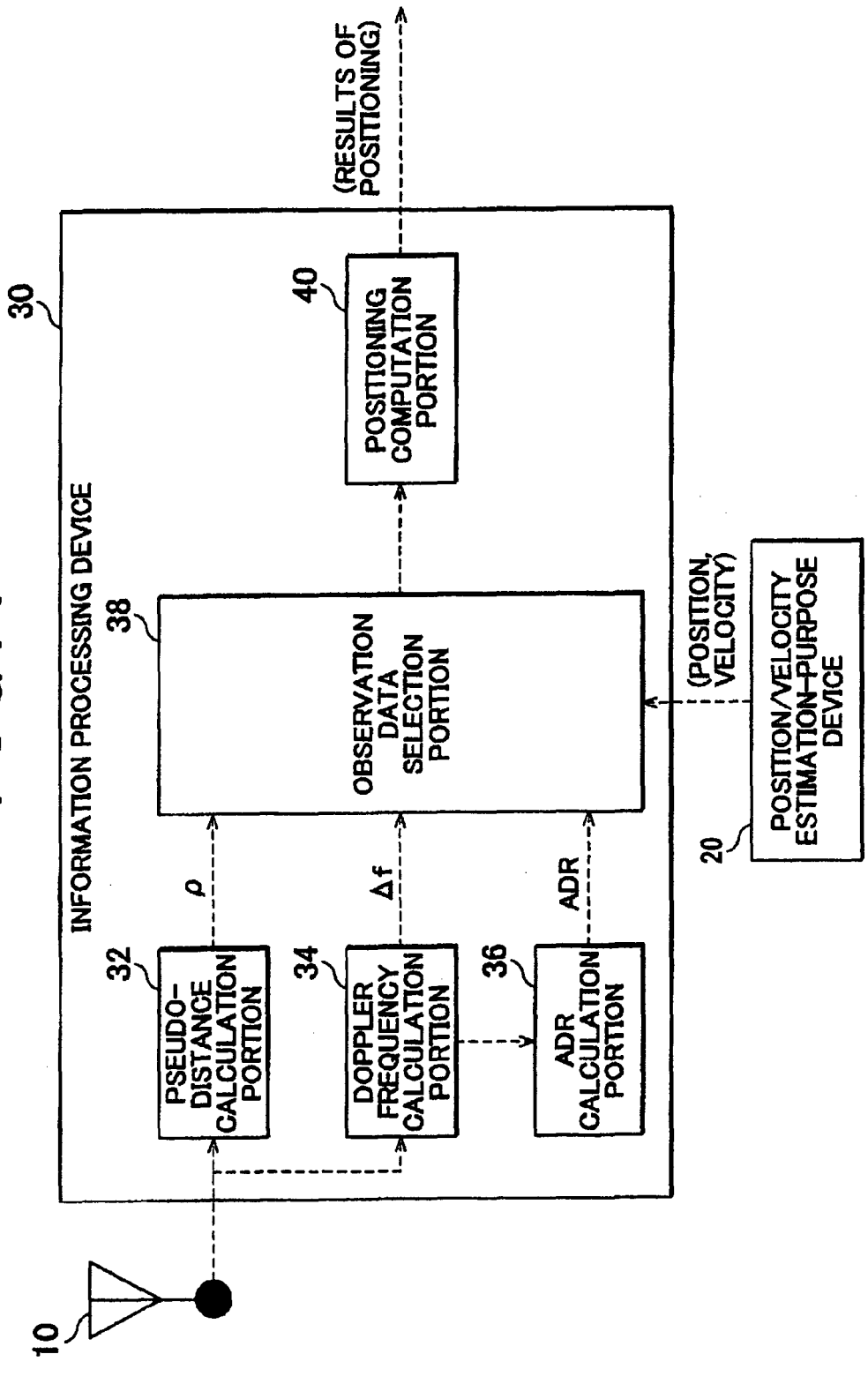
FIG. 1 shows an example of a system configuration of a mobile unit's position measurement apparatus 1.

FIG. 1 is an example of a system configuration of mobile unit's position measurement apparatus 1. The mobile unit's position measurement apparatus 1 has as main components a GPS antenna 10, a position/velocity estimation-purpose device 20, and an information processing device 30.

The position/velocity estimation-purpose device 20 is a device for estimating the position and velocity of a mobile unit by the inertial navigation system (INS), a technique of map matching, or the like. The position/velocity estimation-purpose device 20 includes, for example, a O-sensor, an angular velocity sensor, a vehicle speed sensor, a geomagnetic sensor, a map database, a microcomputer that estimates the position and velocity of a mobile unit using these appliances, etc. With regard to the estimation of the position and the velocity of a mobile unit through the use of the foregoing appliances, various techniques are known to public. Therefore, description of the estimation is omitted herein.

The information processing device 30 is, for example, a microcomputer that has a central processing unit (CPU) as a central portion, a read-only memory (ROM), a random access memory (RAM), etc., that are interconnected by a bus. The information processing device 30 has a storage device, such as a hard disc drive (HDD), a digital versatile disk (DVD) drive, a compact disc-recordable (CD-R) drive, an electronically erasable and programmable read-only memory (EEPROM), etc, and also has an input/output port, a timer, a counter, etc. The ROM stores programs that the CPU executes, and also stores data.

The information processing device 30 has various major functional blocks that function as the CPU executes programs stored in the ROM. The major functional blocks of the device 30 include a pseudo-distance calculation portion 32, a Doppler frequency calculation portion 34, an accumulated Doppler range (ADR) calculation portion 36, an observation data selection portion 38, and a positioning computation portion 40.

The pseudo-distance calculation portion 32 extracts a navigation message from a signal that the GPS antenna 10 receives, by performing a C/A-code synchronization on the signal through the use of a replica C/A code that is internally generated, and also calculates a pseudo-distance $\rho i$ (i=1, 2, . . . n, which will be hereinafter denoted simply as "$\rho$"). Unlike the true distance between a GPS and the mobile unit's position measurement apparatus 1, the pseudo-distance $\rho$ includes a time error (clock bias), an error due to a change in electromagnetic wave propagation velocity. The method of the C/A code synchronization varies to great degrees, and any appropriate method of the C/A code synchronization may be adopted. For example, the method of the C/A code synchronization may be a method that tracks the code phase that peaks the value of correlation of the replica C/A code with the received C/A code, through the use of a delay-locked loop (DLL). The pseudo-distance $\rho$ is calculated, for example, using the following expression (1).

$$\rho = N \times 300 \quad (1)$$

where N corresponds to the number of bits of the C/A code between a GPS satellite and the mobile unit's position measurement apparatus 1, and is calculated on the basis of the phase of the replica C/A code, and a receiver's clock provided within the mobile unit's position measurement apparatus 1. Incidentally, a numerical value of 300 comes from a fact that the duration of one bit of the C/A code 1 is 1 μs, and the length corresponding to one bit thereof is about 300 m (1 μs×speed of light). A signal that represents the pseudo-distance $\rho$ calculated as described above is input to the observation data selection portion 38. Incidentally, the calculated pseudo-distance $\rho$ may also be subjected to a carrier smoothing by a filter (not shown) through the use of an amount of change $\Delta f$ in the Doppler frequency described below, before being input to the positioning computation portion 40.

The Doppler frequency calculation portion 34 has a function of measuring the carrier wave phase of a signal from each satellite, and measures the amount of change $\Delta fi$ in the Doppler frequency (i=1, 2, . . . n, which will hereinafter be denoted simply as "$\Delta f$") of the received carrier wave that has been Doppler-shifted, through the use of a replica carrier that is internally generated. The amount of change $\Delta f$ in the Doppler frequency is measured as a difference (=fr−fc) between the frequency fr of the replica carrier and a known carrier wave frequency fc (1575.42 MHz). This function may be realized by a phase-locked loop (PLL) technique that computes a carrier correlation value through the use of the replica carrier, and thereby tracks the received carrier. The amount of change Δf in the Doppler frequency calculated by the Doppler frequency calculation portion 34 is output to the ADR calculation portion 36, and the observation data selection portion 38.

The ADR calculation portion 36 calculates an ADRi (i=1, 2, ... n, which will hereinafter be denoted simply as "ADR", and which is an integrated value of the amount of change in the Doppler frequency). The ADR calculated by the ADR calculation portion 36 is output to the observation data selection portion 38.

The observation data selection portion 38 determines the reliability of observation data based on a signal from each satellite, using a part or the whole of the observation data (the pseudo-distance ρ, the amount of change Δf in the Doppler frequency, and the ADR). According to results of the determination, the observation data selection portion 38 selects pieces of observation data. In the description below, the observation data selection process is performed through the use of the pseudo-distance ρ.

Figure 2:
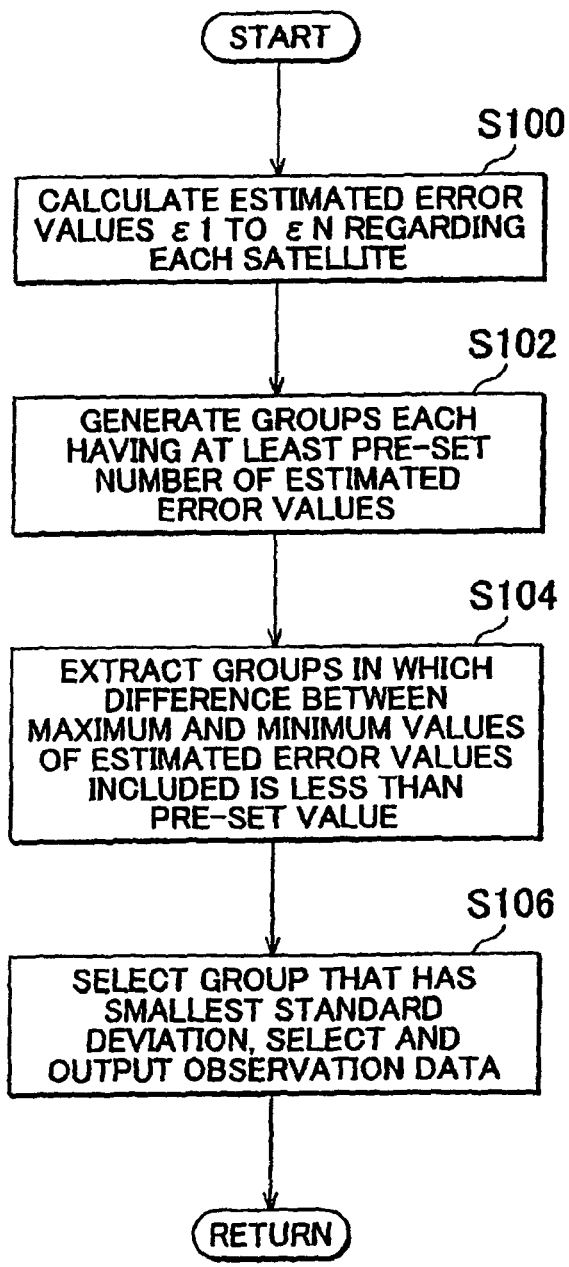
FIG. 2 is a flowchart showing a flow of a observation data selection process performed by an observation data selection portion 38 in accordance with a first embodiment of the invention.

FIG. 2 is a flowchart showing a flow of an observation data selection process performed by the observation data selection portion 38 in accordance with the first embodiment.

Firstly, the observation data selection portion 38 calculates estimated error values of $\epsilon_1, \epsilon_2, \ldots \epsilon_N$ of the observation data regarding the individual satellites, using the pseudo-distance ρ calculated by the pseudo-distance calculation portion 32, and the position estimated by the position/velocity estimation-purpose device 20 (S100). The estimated error value can be found by estimating an amount of change in the pseudo-distance ρ, from a displacement vector from the position of the mobile unit calculated previously in the execution of a repetition process to the presently calculated position of the mobile unit, and a line-of-sight vector connecting a satellite and the mobile unit, and by using a difference between the estimated amount of change in the pseudo-distance ρ and the amount of change in the pseudo-distance ρ calculated by the pseudo-distance calculation portion 32.

Incidentally, in the case where the amount of change Δf in the Doppler frequency is used as observation data, the estimated error values $\epsilon_1, \epsilon_2, \ldots \epsilon_N$ are calculated from the amount of change Δf in the Doppler frequency calculated by the Doppler frequency calculation portion 34, and the velocity estimated by the position/velocity estimation-purpose device 20. Besides, in the case where the ADR is used as observation data, the estimated error values $\epsilon_1, \epsilon_2, \ldots \epsilon_N$ are calculated from the ADR calculated by the ADR calculation portion, and the position estimated by the position/velocity estimation-purpose device 20.

After the estimated error values of $\epsilon_1, \epsilon_2, \ldots$ EN are calculated, groups each of which includes at least a predetermined number of values of these estimated error values $\epsilon_1, \epsilon_2, \ldots \epsilon_N$ of observation data are generated (S102). The predetermined number herein is a number that is commensurate with the number of satellites needed for the positioning computation, and is generally a number of about 4 to 5. Therefore, for example, if N=9 and the predetermined number is four, $_{49}C_4 + _9C_5 + _9C_6 + _9C_7 + _9C_8 + _9C_9$ number of groups are generated.

Next, among the generated groups, groups in which the difference between the maximum value and the minimum value is less than a predetermined value are extracted (S104).

Then, among the extracted groups, a group whose standard deviation is the smallest is selected. Then, satellites that correspond to the estimated error values that are included in the selected group are selected, and pieces of observation data based on signals from the selected satellites are selected, and output to the positioning computation portion 40 (S106).

Through the foregoing process, the group of pieces of observation data whose errors from the position or the like estimated by the position/velocity estimation-purpose device 20 most resemble each other is selected. Therefore, the piece or pieces of observation data whose errors are made larger by a problem on the side of the satellite signals, such as the multipath or the like, are excluded. As a result, pieces of observation data from satellite signals without a problem, such as the multipath or the like, are selected, so that the positioning of the mobile unit can be performed with good precision.

Besides, in the case where there is error in the position or the like estimated by the position/velocity estimation-purpose device 20, the estimated error values of the pieces of observation data whose errors are not made large by a satellite signal-side problem uniformly increase. Therefore, in this case, too, the pieces of observation data whose errors are not made large by a satellite signal-side problem are selected. Hence, the position measurement of a mobile unit can be continuously performed even in the case where there are relatively large, errors in the position or velocity of the mobile unit calculated from outputs of the gyro-sensor or the vehicle speed sensor.

Furthermore, since the foregoing selection technique is a simple and easy technique whose processing load is small, the foregoing technique reduces the processing time and the electric power consumption of the information processing device 30. Hence, the first embodiment, when employed as a vehicle-mounted positioning apparatus that needs to perform continuous processing, achieves great effects.

The positioning computation portion 40 calculates the position and velocity of a mobile unit, using the pieces of observation data selected by the observation data selection portion 38. Concretely, for example, the positioning computation portion 40 calculates the position of a mobile unit by performing a carrier smoothing process on the pseudo-distance ρ through the use of the ADR, and calculates the velocity (velocity vector) of the mobile unit by using the amount of change Δf in the Doppler frequency. With regard to this positioning computation, various techniques are known to public, and therefore detailed description thereof is omitted herein.

According to the foregoing mobile unit's position measurement apparatus 1 of the first embodiment, it is possible to perform the positioning of a mobile unit with increased continuity and precision.

Second Embodiment

Hereinafter a mobile unit's position measurement apparatus 2 in accordance with a second embodiment of the invention will be described. The mobile unit's position measurement apparatus 2 is different from the apparatus of the first embodiment only in the content of the observation data selection process performed by the observation data selection portion 38, and therefore will be described only with regard to differences from the first embodiment.

The observation data selection portion 38 in accordance with the second embodiment determines reliability of observation data based on a signal from each satellite, using amount of change M in the Doppler frequency among pieces of observation data. According to results of the determination, the observation data selection portion 38 selects pieces of observation data.

Figure 3:
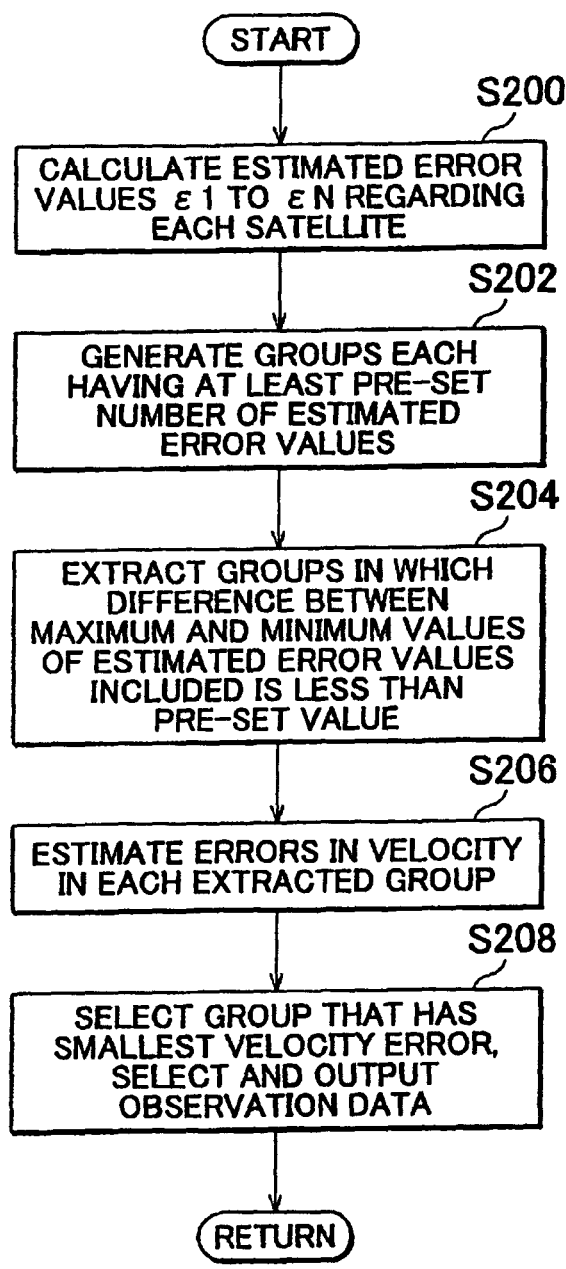
FIG. 3 is a flowchart showing a flow of an observation data selection process performed by the observation data selection portion 38 in accordance with a second embodiment of the invention.

FIG. 3 is a flowchart showing a flow of an observation data selection process performed by the observation data selection portion 38 in accordance with the second embodiment.

Firstly, the observation data selection portion 38 calculates estimated error values of $\epsilon 1, \epsilon 2, \ldots \epsilon N$ of the observation data regarding the individual satellites, using the amount of change $\Delta f$ in the Doppler frequency calculated by the Doppler frequency calculation portion 34, and the position estimated by the position/velocity estimation-purpose device 20 (S200).

After the estimated error values of $\epsilon 1, \epsilon 2, \ldots \epsilon N$ are calculated, groups each of which includes at least a predetermined number of values of these estimated error values $\epsilon 1$, $\epsilon 2, \ldots \epsilon N$ of observation data are generated (S202). The predetermined number herein is a number that is commensurate with the number of satellites needed for the positioning computation, and is generally a number of about 4 to 5. Therefore, for example, if N=9 and the predetermined number is four, $_{49}C_4 + _9C_5 + _9C_6 + _9C_7 + _9C_8 + _9C_9$ number of groups are generated.

Next, among the generated groups, groups in which the difference between the maximum value and the minimum value is less than a predetermined value are extracted (S204).

Then, with regard to each of the extracted groups, the observation data selection portion 38 estimates an error in the velocity (S206). The error in velocity is estimated, for example, using an observation equation of a least-squares method. The following expression is an example of the velocity error estimation that uses an observation equation of a least-squares method.

$$E_v = (H^T H)^{-1} H^T e$$

where:
Ev represents the error vector of velocity;
$e = [\epsilon \, \epsilon \, \ldots \, \epsilon]$ represent a column vector that is created from estimated values of errors in the group;

$$H = \begin{bmatrix} g_1 & 1 \\ \vdots & \vdots \\ g_M & 1 \end{bmatrix}$$

represents a design matrix; and $$g = \left( \frac{\hat{r}_R - r_S}{\|\hat{r}_R - r_S\|} \right)^T$$

represents the line-of-sight vector from a satellite to the receiver.

After velocity error is estimated with regard to each group, the group that has the smallest velocity error among the groups is selected. Then, satellites that correspond to the estimated error values that are included in the selected group are selected. After that, pieces of observation data based on signals from the selected satellites are selected, and are output to the positioning computation portion 40 (S208).

Through this process, the group of pieces of observation data whose errors from the velocity estimated by the position/velocity estimation-purpose device 20 most resemble each other is selected. Therefore, the piece or pieces of observation data whose errors are made larger by a problem on the side of the satellite signals, such as the multipath or the like, are excluded. As a result, pieces of observation data from satellite signals without problems, such as the multipath or the like, are selected, so that the positioning of the mobile unit can be performed with good precision.

Besides, in the case where there is error in the position or the like estimated by the position/velocity estimation-purpose device 20, the estimated error values of the pieces of observation data whose errors are not made large by a satellite signal-side problem uniformly increase. Therefore, in this case, too, the pieces of observation data whose errors are not made large by a satellite signal-side problem are selected. Hence, the position measurement of a mobile unit can be continuously performed even in the case where there are relatively large errors in the position or velocity of the mobile unit calculated from outputs of the gyro-sensor or the vehicle speed sensor.

According to the foregoing mobile unit's position measurement apparatus 2 of, the second embodiment, it is possible to perform the positioning of a mobile unit with increased continuity and precision.

Third Embodiment

Hereinafter, a mobile unit's position measurement apparatus 3 in accordance with a third embodiment of the invention will be described. The mobile unit's position measurement apparatus 3 is different from the apparatuses of the first and second embodiments only in the content of the observation data selection process performed by the observation data selection portion 38, and therefore will be described only with regard to differences from the first and second embodiments.

The observation data selection portion 38 in accordance with the third embodiment performs test of differences of the individual estimated error values $\epsilon 1, \epsilon 2, \ldots \epsilon N$ from a mean value. According to results of the test, the observation data selection portion 38 selects pieces of observation data. In the following description, the observation data selection portion 38 performs the observation data selection process using the pseudo-distance $\rho$.

Figure 4:
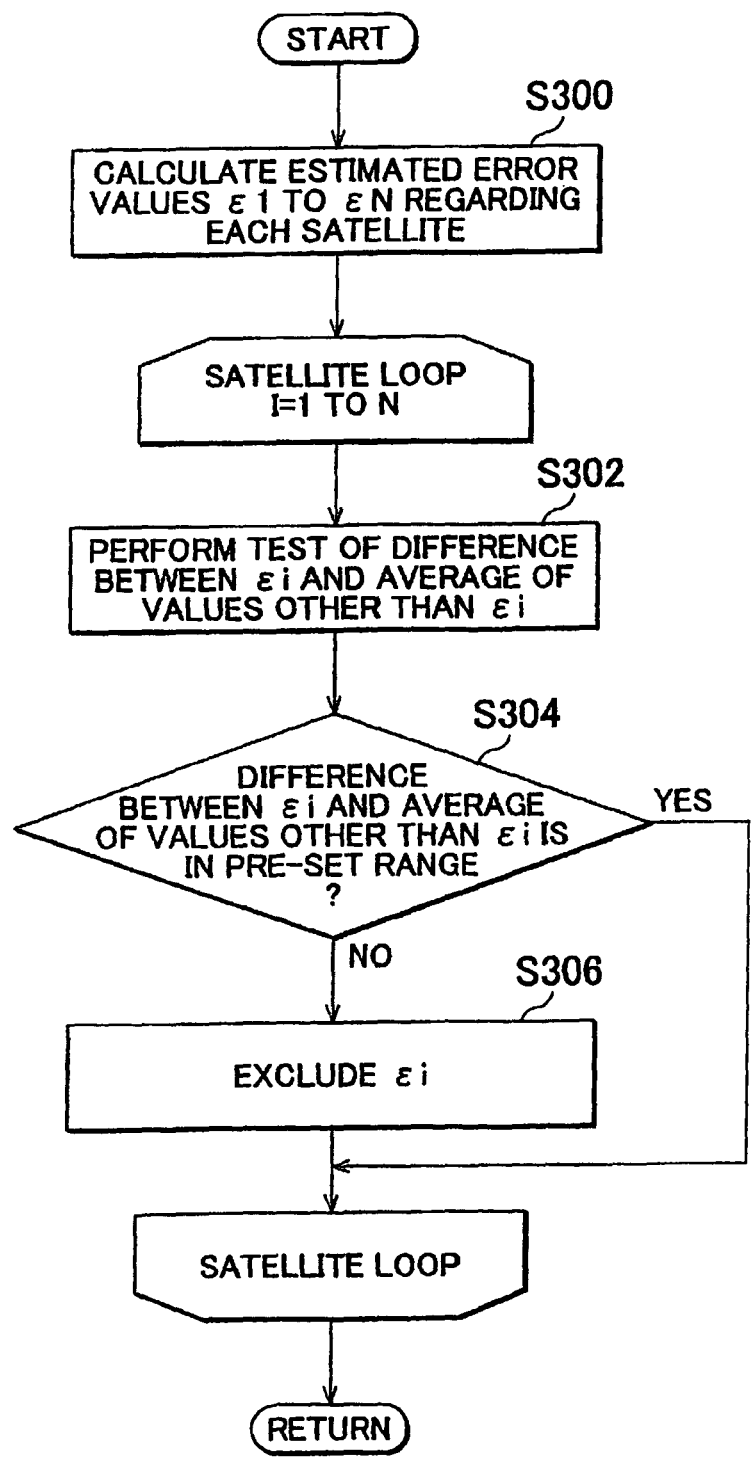
FIG. 4 is a flowchart showing a flow of an observation data selection process performed by the observation data selection portion 38 in accordance with a third embodiment of the invention.

FIG. 4 is a flowchart showing a flow of an observation data selection process performed by the observation data selection portion 38 in accordance with the third embodiment.

Firstly, the observation data selection portion 38 calculates estimated error values $\epsilon 1, \epsilon 2, \ldots \epsilon N$ of the pieces of observation data regarding the individual satellites, using the pseudo-distance $\rho$ calculated by the pseudo-distance calculation portion 32, and the position estimated by the position/velocity estimation-purpose device 20 (S300).

Incidentally, in the case where the amount of change $\Delta f$ in the Doppler frequency is used as observation data, the estimated error values $\epsilon 1, \epsilon 2, \ldots \epsilon N$ are calculated from the amount of change $\Delta f$ in the Doppler frequency calculated by the Doppler frequency calculation portion 34, and the velocity estimated by the position/velocity estimation-purpose device 20. Besides, in the case where the ADR is used as observation data, the estimated error values $\epsilon 1, \epsilon 2, \ldots \epsilon N$ are calculated from the ADR calculated by the ADR calculation portion, and the position estimated by the position/velocity estimation-purpose device 20.

After the estimated error values $\epsilon 1, \epsilon 2, \ldots \epsilon N$ are calculated, the following process is executed with regard to each of the satellites.

Test of a difference between an estimated error value $\epsilon i$ and a mean value of the estimated error values other than $\epsilon i$ is performed (S302).

Then, it is determined whether or not the difference between the estimated error value $\epsilon i$ and the mean value of the estimated error values other than $\epsilon i$ is within a predetermined range (S304). If the difference is not within the predetermined range, the estimated error value ∈i is excluded as an abnormal value (S306).

Through the foregoing process, the group of pieces of observation data whose errors from the position or the like estimated by the position/velocity estimation-purpose device 20 most resemble each other is selected. Therefore, the piece or pieces of observation data whose errors are made larger by a problem on the side of the satellite signals, such as the multipath or the like, are excluded. As a result, pieces of observation data from satellite signals without a problem, such as the multipath or the like, are selected, so that the positioning of the mobile unit can be performed with good precision.

Besides, in the case where there is error in the position or the like estimated by the position/velocity estimation-purpose device 20, the estimated error values of the pieces of observation data whose errors are not made large by a satellite signal-side problem uniformly increase. Therefore, in this case, too, the pieces of observation data whose errors are not made larger by a satellite signal-side problem are selected. Hence, the position measurement of a mobile unit can be continuously performed even in the case where there are relatively large errors in the position or velocity of the mobile unit calculated from outputs of the gyro-sensor or the vehicle speed sensor.

According to the foregoing mobile unit's position measurement apparatus 3 of the third embodiment, it is possible to perform the positioning of a mobile unit with increased continuity and precision.

Incidentally, instead of the test of differences from mean values in the third embodiment, it is also possible to perform a Smirnoff-Grubbs test, a Q test, etc. In any case, the test is repeatedly performed until there is no abnormal value, and the remaining pieces of data are regarded as normal values.

The invention is not limited in any manner by the foregoing embodiments, but may also be modified or substituted in various manners without departing from the spirit of the invention.

The invention claimed is:

1. A mobile unit's position measurement apparatus comprising:
   a reception portion that receives signals from a plurality of satellites;
   an observation data selection portion
      that calculates a plurality of estimated error values that correspond respectively to a plurality of pieces of observation data obtained by observing the signals received by the reception portion,
      that generates groups, each of which includes estimated error values corresponding to at least a predetermined number of satellites, and
      then extracts, from the estimated error value groups generated, estimated error value groups in which a difference between a maximum value and a minimum value of the estimated error values included is less than a predetermined value, and
      that consequently selects pieces of observation data provided by the signals from the satellites that correspond to the estimated error values that are included in an estimated error value group whose standard deviation of the estimated error values is smallest among the estimated error value groups extracted; and
   a positioning computation portion that performs a positioning computation based on the pieces of observation data selected by the observation data selection portion.

2. The mobile unit's position measurement apparatus according to claim 1, wherein the observation data is at least one of a pseudo-distance between the plurality of satellites and the mobile unit's position measurement apparatus, an amount of change in the Doppler frequency of a signal that the reception portion receives, and an integrated value of the amount of change in the Doppler frequency.

3. The mobile unit's position measurement apparatus according to claim 2, further comprising a position/velocity estimation portion that estimates a position and a velocity of the mobile unit, wherein the observation data selection portion calculates the estimated error value based on the pseudo-distance, and the position of the mobile unit.

4. The mobile unit's position measurement apparatus according to claim 3, wherein, the observation data selection portion calculates the estimated error value based on the amount of change in the Doppler frequency, and the velocity of the mobile unit.

5. The mobile unit's position measurement apparatus according to claim 2, wherein the observation data selection portion calculates the estimated error value based on the integrated value of the amount of change in the Doppler frequency, and the position of the mobile unit.

6. The mobile unit's position measurement apparatus according to claim 1, wherein
   each of the generated groups includes at least a predetermined number of estimated error values selected from the plurality of estimated error values calculated, and
   the groups are generated based on combinations of the at least the predetermined number of estimated error values.

7. The mobile unit's position measurement apparatus according to claim 6, wherein the predetermined number estimated error values is commensurate with the predetermined number of satellites.

8. The mobile unit's position measurement apparatus according to claim 6, wherein the groups are generated based on all possible combinations of the at least the predetermined number of estimated error values.

9. The mobile unit's position measurement apparatus according to claim 1, wherein the generated groups includes x generated groups, where $x = {}_nC_r + {}_nC_{r+1} + {}_nC_{r+2} \ldots {}_nC_n$, n is a total number of the plurality of estimated error values, and r is the predetermined number of satellites.

10. The mobile unit's position measurement apparatus according to claim 1, wherein the generated groups include groups of each possible combination of at least a predetermined number of the plurality of estimated error values.

11. The mobile unit's position measurement apparatus according to claim 10, wherein the predetermined number of the plurality of estimated error values is the predetermined number of satellites.

12. The mobile unit's position measurement apparatus according to claim 11, wherein the predetermined number of satellites is a number of satellites needed for the positioning computation.

13. A mobile unit's position measurement method comprising:
   calculating a plurality of estimated error values that correspond respectively to a plurality of pieces of observation data that are obtained by observing signals transmitted from a plurality of satellites;
   generating groups, each of which includes estimated error values corresponding to at least a predetermined number of satellites; then
   extracting, from the estimated error value groups generated, estimated error value groups in which a difference between a maximum value and a minimum value of the estimated error values included is less than a predetermined value; and then selecting pieces of observation data provided by the signals from the satellites that correspond to the estimated error values that are included in an estimated error value group whose standard deviation of the estimated error values is smallest among the estimated error value groups extracted; and performing a positioning computation based on the at least one or all of the pieces of observation data selected.

* * * * *